United States Patent [19]

Marchionne

[11] Patent Number: 4,625,981
[45] Date of Patent: Dec. 2, 1986

[54] HARNESS RACING SULKY

[76] Inventor: Anthony Marchionne, 35 Linda La., Yonkers, N.Y. 10710

[21] Appl. No.: 682,245

[22] Filed: Dec. 17, 1984

[51] Int. Cl.[4] .................................................. B62C 1/08
[52] U.S. Cl. ..................................... 280/63; 280/47.27
[58] Field of Search ........................ 280/63, 70, 71, 75, 280/76, 47.24, 47.26, 47.27; D12/19

[56] References Cited

U.S. PATENT DOCUMENTS

| | | | |
|---|---|---|---|
| D. 149,157 | 3/1948 | White | 280/63 |
| D. 149,451 | 4/1948 | Shuttleworth | 280/63 |
| 762,038 | 6/1904 | Frazier | 280/63 |
| 948,767 | 2/1910 | Miller | 280/63 |
| 1,573,318 | 2/1926 | Huber | 280/63 |
| 2,896,962 | 7/1959 | Gaines | 280/63 |
| 3,163,438 | 12/1964 | Bliss, Jr. | 280/63 |
| 3,173,706 | 3/1965 | Brittan | 280/63 |
| 3,847,408 | 11/1974 | King | 280/63 |
| 3,942,305 | 3/1976 | Cameron | 280/63 |
| 4,033,598 | 7/1977 | King | 280/63 |
| 4,072,000 | 2/1978 | Clemens | 280/63 |
| 4,078,829 | 3/1978 | Davis | 280/63 |

FOREIGN PATENT DOCUMENTS 21715 of 1897 United Kingdom .................. 280/63

Primary Examiner—John J. Love
Assistant Examiner—Karin L. Ferriter
Attorney, Agent, or Firm—Kenyon & Kenyon

[57] ABSTRACT

A harness racing sulky has a chassis frame comprising an elongated, horizontal, transverse member and two vertically disposed, generally U-shaped members located below and at the ends of the elongated, horizontal, transverse member. Each U-shaped member comprises a rearwardly inclined back leg joined to the respective end of the elongated, horizontal member. Two approximately parallel shafts extend forward from the chassis frame. The rear end of each shaft is joined to the rear leg of a respective U-shaped member. The front leg of each U-shaped member is joined to a respective shaft forward of the rear of the shaft. Wheels are rotatably mounted to the inverted apex of each U-shaped member. The axes of each wheel are coincident. The elongated, horizontal, member is located to the rear of the coincident axes of the wheels. A seat is mounted over the elongated, horizontal, member and is thereby located to the rear of the coincident axes of the wheels. The shafts advantageously have a concave facing downward geometry extending substantially along the length of the shaft.

21 Claims, 7 Drawing Figures

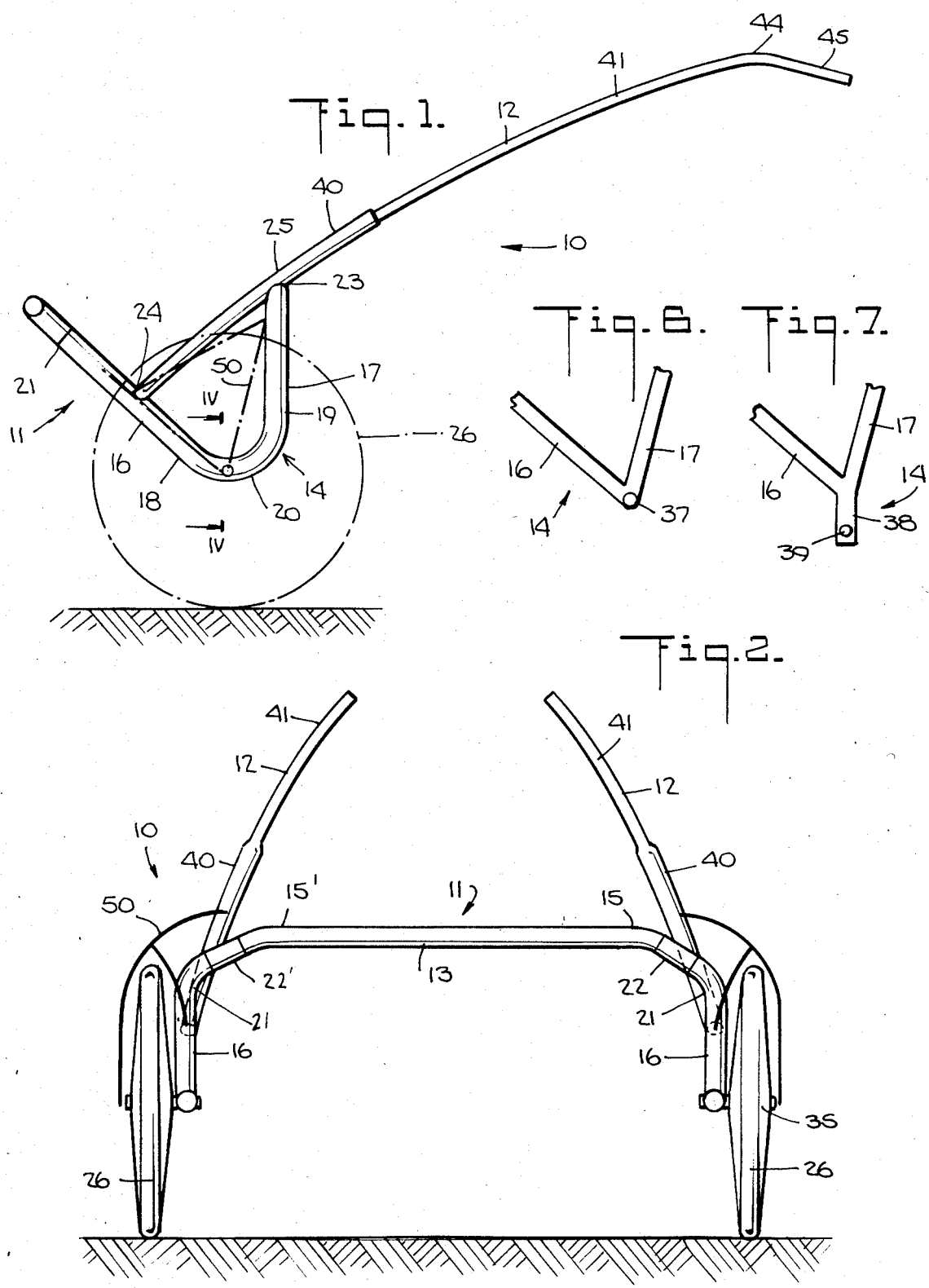

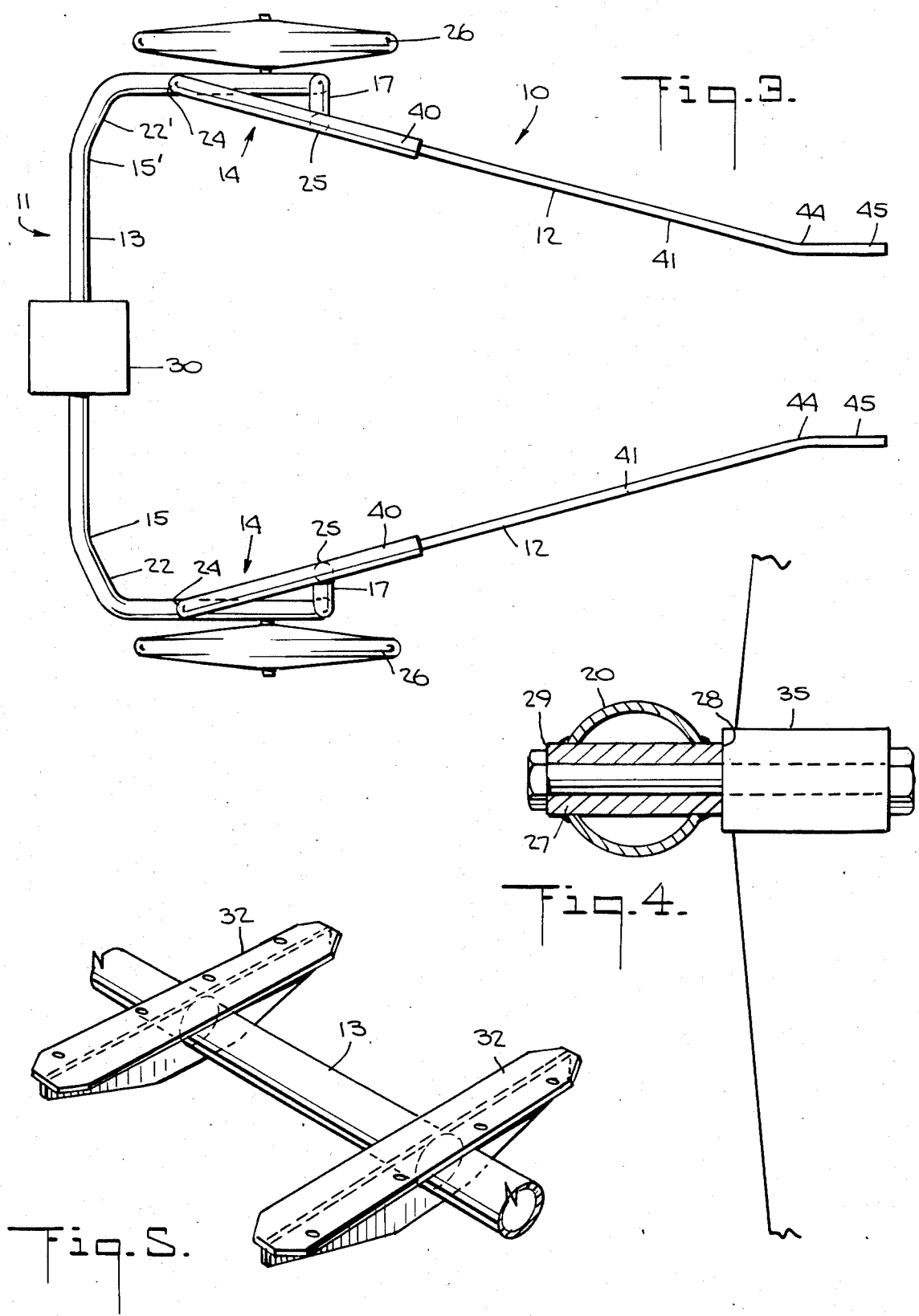

HARNESS RACING SULKY

FIELD OF INVENTION

This invention relates to harness racing sulkies.

BACKGROUND OF THE INVENTION

Harness racing sulkies comprising a two-wheeled cart or chassis for seating a driver and having two approximately parallel, spaced apart shafts extending forward from the cart are well known in the art. A horse is disposed between the two shafts and the shafts are hitched to the horse. The art has continuously sought improved designs for the sulky itself and the manner in which the sulky is hitched to the horse in order to increase speed during racing. Recent proposed harness racing sulky designs are disclosed, for example, in U.S. Pat. Nos. 3,847,408 and 4,033,598 both to King, and U.S. Pat. No. 4,078,829 to Davis.

OBJECTS OF THE INVENTION

It is an object of the present invention to provide a harness racing sulky which results in improved performance and which has a design eliminating the complexity of prior art designs and thereby reduces the cost of fabrication.

It is another object of the present invention to provide a harness racing sulky which locates the mass of the driver on the sulky so as to result in an improved vertical uplift force on the horse.

It is a further object of the present invention to provide a harness racing sulky wherein the driver is positioned closer to the rear end of the horse which results in better control, less air drag and better tracking in turns.

It is still another object of the present invention to provide a harness racing sulky so as to improve imparting vertical uplift on the horse and improve imparting the forward momentum of the sulky to the horse.

It is yet another object of the present invention to provide a harness racing sulky having a framework of increased rigidity at the wheel attachment point so as to maintain the wheels in a parallel relationship thereby reducing unwanted drag.

It is still a further object of the present invention to provide a harness racing sulky having an improved means for mounting the wheels to the sulky frame so as to provide a more rigid attachment of the wheels to the frame.

These and other objects of the present invention will become apparent from the following description and claims in conjunction with the drawings.

SUMMARY OF THE INVENTION

A harness racing sulky comprises a chassis, two wheels rotatably mounted to the chassis, and two generally parallel, spaced apart shafts each joined at one end to the chassis and each extending forward from the chassis for attachment to a horse disposed between the two shafts. A seat is mounted on the chassis for the driver.

In accordance with the present invention, the chassis comprises a continuous frame member formed from a horizontal, elongated, transverse member and two vertically disposed, generally U-shaped members located below and at the ends of the horizontal, elongated, transverse member. A wheel is rotatably mounted to the base of each generally U-shaped member.

Each generally U-shaped member comprises a generally vertically disposed and rearwardly inclined back leg. The top of the back leg is joined by a transition member to a respective end of the horizontal, elongated, transverse member. The U-shaped member has a generally vertically disposed front leg forward of the back leg. A curved base member joins the bottom of the back and front legs forming the generally U-shaped structure. The horizontal, elongated, transverse member, the two generally U-shaped members, and the two transition members form a continuous frame member preferably fabricated from a tubular metal. The tubular metal is suitably round. The continuous frame member may be bent from a single, continuous tubular member or fabricated, e.g., by welding a plurality of bended tubular portions so as to effectively provide a continuous frame.

A wheel is mounted to the base member or apex of each generally U-shaped member in a manner so that the axis of each wheel is coincident. Because the horizontal, elongated, transverse member is joined to the rearwardly inclined back leg of the U-shaped member, the horizontal, elongated, transverse member is located to the rear of the coincident axes of the wheels. The seat is mounted on the horizontal, elongated, transverse member so that the entire area of the seat is located to the rear of the coincident axes of the wheels. Accordingly, a substantial portion of the mass of the driver is located to the rear of the coincident axes of the wheels.

The respective shaft members have their rear end joined to the rear leg of a respective U-shaped member intermediate to the top and bottom of the rear leg. The top end of each front leg of the generally U-shaped member is joined to a respective shaft forward of the rear end of the shaft. The connection of a shaft to the back and front leg of a respective generally U-shaped member results in a structure having a generally triangular shape. This provides a framework of great rigidity for the mounting of the wheels.

A preferred means for rotatably mounting the wheels to the base member of the generally U-shaped member of the generally triangular framework is to provide a bore in the base member for receiving the mounting means. Suitably, a bushing having a vertical machined surface is welded into the bore with the mounting means received by the bushing. The smooth vertical machined surface of the bushing faces the hub of the wheel.

The forwardly extending, generally upwardly inclined shaft members advantageously have a curved arch geometry and terminate at the forward end with an extension member which is bent at an angle downward with respect to the shaft. This downwardly bent extension member is attached to the horse in a conventional manner and the geometry of the shafts and the extension member assists in providing vertical lift and forward momentum to the horse.

BRIEF DESCRIPTION OF THE DRAWINGS

In the drawings forming part hereof wherein like reference numbers in the various figures identify similar parts:

FIG. 1 schematically illustrates a side view of one embodiment of a racing sulky in accordance with the present invention with the wheels and the wheel guards to illustrated in phantom increase clarity and understanding;

FIG. 2 schematically illustrates a rear view of the embodiment of the racing sulky of the invention illustrated in FIG. 1 with the seat removed;

FIG. 3 schematically illustrates a top view of the embodiment of the racing sulky of the invention illustrated in FIG. 1 having the seat installed.

FIG. 4 is a schematic cross-sectional detail along line IV—IV of FIG. 1;

FIG. 5 schematically illustrates a detail of a seat bracket useful in connection with the present invention;

FIG. 6 schematically illustrates one alternative embodiment of a generally U-shaped frame for mounting a sulky wheel; and FIG. 7 schematically illustrates another alternative embodiment of a generally U-shaped frame for mounting a sulky wheel.

DETAILED DESCRIPTION

In order to afford a more complete understanding of the present invention and an appreciation of its advantages, a detailed description of preferred embodiments follows.

The racing sulky 10 comprises a chassis 11 and two approximately parallel shafts 12. In operation, a horse would be disposed between the shaft members 12 and the shaft members 12 attached or hitched to the horse.

The chassis 11 comprises a horizontally disposed elongated member 13 oriented transverse to the approximately parallel shafts 12 and two generally vertically disposed, generally U-shaped members 14 located below respective ends 15, 15' of elongated member 13.

Each U-shaped member 14 comprises a generally vertically disposed, rearwardly inclined back leg 16 and a generally vertically disposed front leg 17 located forward of the back leg 16. The lower end 18 of back leg 16 is joined to the lower end 19 of front leg 17 by curved base member 20 thereby forming the generally U-shaped member. The top end 21 of back leg 16 of each U-shaped member 14 is joined to respective ends 15, 15' of elongated member 13 by transition members 22, 22' thereby forming a continuous chassis frame. As best illustrated in FIG. 3, the approximately parallel shafts 12 suitably converge inwardly toward the center line of the sulky 10. Accordingly, generally vertically disposed front leg 17 would be bent on an incline slightly inward to intersect the respective shafts 12 at 25. Alternately, the front leg 17 could be vertical and a horizontal transition piece provided to connect the top 23 of front leg 17 to the respective shafts 12.

The horizontal separation of the top end 21 of the back leg 16 from the top end 23 of the front leg 17 in the longitudinal or fore-and-aft direction of the sulky is very large compared to the horizontal separation of the lower end 18 of back leg 16 and the lower end 19 of front leg 17. Thus, generally U-shaped member 14 approximates a V-shaped member having a curved apex. The generally U-shaped member 14 could be V-shaped as illusrated in FIG. 6 and have, e.g., a bore 37 located at the inverted apex of the V for mounting a wheel.

Alternatively, as illustrated in FIG. 7, the generally U-shaped member could have a Y configuration comprising a downwardly extending member 38 extending downward from the base or inverted apex of a generally U or V shaped configuration formed by the front leg 17 and back leg 16. A bore 39 would be provided in downwardly extending member 38 for mounting a wheel.

The continuous chassis frame member comprising elongated member 13, transition members 22, 22' and the two U-shaped members 14 is preferably fabricated from hollow tubular metal material and most suitably round hollow tubular metal. Preferably, the tubular metal material will have a constant cross-section [or constant diameter for round tubular metal] along the entire continuous frame. This continuous frame is suitably fabricated by bending a single length of tubular material or it may effectively be a continuous frame member fabricated by welding or otherwise joining appropriately bent component parts. Suitably, all bends are on radius as shown in the illustrated embodiments and there are no sharp or abrupt corners. The continuous frame member may be usefully fabricated from 1¾ inch diameter steel tubing, ASTM A519 (seamless carbon and alloy steel mechanical tubing) grade 4130, normalized. It will be appreciated that other materials may be used.

The rear end 24 of each shaft 12 is joined, advantageously by welding, to a respective back leg 16 of each generally U-shaped member 14 at a position which is suitably intermediate the top end 21 and the lower end 18. The top end 23 of a respective front leg 17 of each generally U-shaped member 14 is joined, advantageously by welding, to a respective shaft 12 at a position 25 forward of the rear end 24 of the shaft 12. This joining of generally U-shaped member 14 to shaft 12, advantageously by welding, forms a generally closed triangular structure or framework. This triangular framework of the present invention provides a structure for the attachment of the sulky's wheels 26 which has a rigidity superior to the rigidity of known existing sulky designs. This improved rigidity improves maintaining the wheels in parallel relationship when the sulky is in operation and reduces unwanted drag. This improved rigidity also reduces the tendency of the weight of the driver to cause displacement of the wheels 26 from the vertical plane.

A wheel 26 is rotatably mounted to the base member 20 of each generally U-shaped member 14 outboard of the U-shaped base member 14. The wheels 26 are mounted so that the axis of each wheel is coincident and the wheels 26 are in a vertical plane. The coincident axes of the wheels 26 are suitably parallel to elongated member 13. Elongated member 13 is located well behind the coincident axes of wheels 26 because the back legs 16 of U-shaped member 14 are rearwardly inclined. Conventional mounting means may be employed to rotatably mount the wheels 26. A preferred structure for mounting of wheels 26 is illustrated in FIG. 4. A bore is made through base member 20. A tubular wheel axle bushing 27 is inserted in this bore and welded at both ends to the base member 20. The wheel 26 may thus be connected to the U-shape member 14 by a bolt. This structure provides an attachment of the wheel to the sulky frame which has improved rigidity. By way of example, if 1¾ inch diameter tubing is used for the U-shaped member 14, a bushing having an 0.875 inch outer diameter and a 0.37 inch inner diameter may be inserted into an appropriately sized bore in base member 20 and welded in place. The ends 28, 29 of the bushing 27 are ground smooth and are in a vertical plane after installation. The centerline of the hole of the bushing is horizontal and perpendicular to surfaces 28, 29. The smooth machined outer surface 28 of bushing 27 located in a vertical plane will have the hub 35 of a wheel resting against it and thus improves maintaining the wheel in a vertical plane.

A seat 30 (FIG. 3) is mounted on elongated member 13. The entire area of seat 30 is to the rear of the coincident axes of wheels 26. For example, if the center line of elongated member 13 is located 20 inches behind the coincident axes of wheels 26, a seat having a length of 11 inches in the longitudinal or fore-and-aft direction could be bolted centered on elongated member 13. Thus, the forward edge of the seat would be 14½ inches behind the coincident axes of wheels 26. Driver stirrups (not illustrated) are provided in a conventional manner.

Because of the location of the seat 30 mounted on elongated member 13, the mass of the driver is substantially located to the rear of the coincident axes of wheels 26. The mass of the driver in cooperation with the closed triangular frame formed by generally U-shaped member 14 joined to shafts 12 with the wheel axes acting as a fulcrum provides an improved vertical uplift effect on the horse as transmitted through shafts 12. This especially helps horses with front end lameness. The structure of the present invention permits the mass of the driver to be substantially located to the rear of the sulky's wheel axes while permitting the driver to be located closer to the rear end of the horse than was permitted by prior art designs, e.g., prior art cantilever type seat mountings. Elimination of complex bracing provides room for the horses rear legs and permits the rear of the horse to be closer to the driver. Having the seat positioned over elongated member 13 also permits the rear of the horse to be closer to the driver. Positioning the driver closer to the rear end of the horse results in better control, less air drag, and better tracking in the turns.

An advantageous structure for mounting seat 30 to elongated member 13 is illustrated in FIG. 5. A pair of elongated T-shaped brackets 32 are provided with a bore in the web of the T. The tubular elongated member 13 is inserted into the bore and welded to the T-bracket. Holes are placed in the flange of the T-brackets along the length of the T-brackets and the seat 30 is bolted to the T-brackets 32 through these holes.

The generally parallel shafts 12 may have two portions 40 and 41 comprising hollow tubular members of different diameters. By way of example, rear portion 40 may be a 1½ inch diameter tubular member and forward portion 41 may be a 1¼ inch diameter tubular member. As best seen in FIG. 1, each shaft may have a slight concave downward arch. The approximately parallel shafts 12 may converge inwardly toward the center line of the sulky as illustrated in FIGS. 2 and 3.

A shaft 12 with a rear shaft portion 40 having a greater diameter than forward shaft portion 41 is used because bending moment along the length of the shaft 12 decreases as one proceeds forward from the sulky chassis 11 toward the front end of the shaft 12 which is hitched to the horse. The decreased diameter at the forward shaft portion permits reduction in weight and wind resistance in a location where the large diameter is not necessary for the bending moment and stress. If the shafts 12 were fabricated from plastic or wood, one could employ a shaft having a continuously decreasing diameter as one proceeded forward along the shaft because such a design could be more feasibly fabricated with plastic or wood.

Preferably, each shaft 12 terminates in a short extension member 45 at the forward end 44 of each shaft. The extension members 45 are bent at an angle downward with respect to shaft 12 as best seen in FIG. 1. The extension members 45 are hitched to the horse in a conventional manner. The geometry of the extension members 45 assists in providing vertical uplift on the horse and imparting a forward force on the horse from the momentum of the sulky and driver when the sulky is in operation.

As illustrated in FIG. 1, the concave facing downward arch of the shafts 12 may advantageously extend from the rear end 24 to the forward end 44 of a shaft 12. The concave downward facing geometry extends along substantially the length of each shaft. The arch-like shaft 12 flexes with the movement of the horse. Suitably, the concave downward facing arch-like shaft 12 is defined by a constant radius. When the horses feet are on the ground, the arch-like shafts compress. When all four feet of the horse are off the ground (common in the gait of harness racing horses), the arch-like shafts expand and provide forward momentum to the horse. The sulky may be designed to match the natural frequency of the structure to the gait of the horse. By way of example, the shafts 12 may be manufactured having a 144 inch radius.

As illustrated in FIG. 2, wheel guards 50 may be provided to protect the wheels from external objects. The wheel guards 50 are for protective purposes, are of light construction and are not necessary for the improved rigid frame structure of the invention. For example, wheel guards may be fabricated from oval tubing (1 inch equivalent round O.D.) having a 20 gage (0.035 inch) wall. The major axis would be 1.29 inch and the minor axis 0.65 inch.

It will be appreciated that the two generally U-shaped members 14, the two shafts 12, and the two wheels 26 are substantially symmetrical about the longitudinal center line of sulky 10.

It will be further appreciated that the present invention provides a sulky of simple design having a rigid frame for mounting of the wheels while substantially locating the mass of the driver to the rear of the axes of the wheels and locating the rear of the horse close to the driver. The three parts comprising the continuous frame chassis and the two shafts improves upon the complex designs of the prior art and reduces fabrication costs.

Although preferred embodiments of the present invention have have been described in detail, it is understood that modifications may be made by those skilled in the art all within the spirit and scope of the present invention as defined in the claims.

What is claimed is:

1. In a harness racing sulky comprising a chassis, and a first and a second approximately parallel, spaced apart shaft wherein each shaft has a rear end joined to said chassis and each shaft extends forward from said chassis for attachment to a horse to be disposed therebetween, the improvement comprising:
   said chassis being a continuous frame member formed by an elongated, horizontally disposed member having a first end and a second end oriented generally transverse to said shafts and a first and second vertically disposed, generally U-shaped member each located respectively below the first end and the second end of said horizontally disposed member, wherein each generally U-shaped member comprises;
   a generally vertically disposed and rearwardly inclined back leg having a top end and a bottom end, a generally vertically disposed front leg located forward of said back leg and having a top end and a bottom end, a base member joining said bottom ends of said back leg and said front leg, a transition member joining the top end of said back leg to a respective end of said horizontally disposed member, said rear end of a respective shaft joined to said said back leg, said top end of said front leg joined to said respective shaft forward of said shaft rear end, whereby said back leg, said front leg and the portion of said respective shaft between said rear end of said shaft and said joining of said top end of said front leg to said shaft forms a generally closed triangular structure;

means for rotatably mounting a wheel to said base member of each U-shaped member located so that the axis of each wheel is coincident, whereby said horizontally disposed member is located to the rear of the coincident axes of said wheels.

2. A racing sulky as recited in claim 1 wherein said base member is a curved member.

3. A racing sulky as recited in claim 2 wherein a seat is mounted over said horizontally disposed transverse member and the entire area of said seat is located to the rear of said coincident axes of said wheels.

4. A racing sulky as recited in claim 2 wherein said continuous frame member is formed from a continuous piece of hollowing tubing.

5. A racing sulky as recited in claim 4 wherein said tubing is round hollow tubing.

6. A racing sulky as recited in claim 5 wherein said round hollow tubing forming said continuous frame member has a constant diameter along the horizontally disposed member, the transition members, and each of said U-shaped members.

7. A racing sulky as recited in claim 4 wherein said hollow tubing is steel.

8. A racing sulky as recited in claim 4 wherein said tubing forming said continuous frame member is hollow and has a constant cross-section along the horizontally disposed member, the transition members, and each of said U-shaped members.

9. A racing sulky as recited in claim 4 wherein each forwardly extending shaft terminates in an extension member with said extension member bent at an angle downward with resect to a respective shaft and each shaft is a hollow tubular member.

10. A racing sulky as recited in claim 2 wherein said rotatable mounting means for said wheels comprises said base member having a bore therethrough.

11. A racing sulky as recited in claim 10 wherein a bushing having a smooth vertical surface facing the wheel is fixedly mounted in said bore.

12. A racing sulky as recited in claim 2 wherein:
a seat is mounted over said horizontally disposed member and the entire area of said seat is located to the rear of said coincident axes of said wheels;
said continuous frame member comprises a continuous piece of hollow tubing having a constant cross-section along the horizontally disposed member, the transition members, and each of said U-shaped members; and
said rotatable mounting means for said wheels comprises said base member having a bore therethrough.

13. A racing sulky as recited in claim 12 wherein said hollow tubing is round.

14. A racing sulky as recited in claim 13 wherein a bushing having a smooth vertical surface facing the wheel is fixedly mounted in said bore.

15. A racing sulky as recited in claim 14 wherein each forwardly extending shaft terminates in an extension member with said extension member bent at an angle downward with respect to a respective shaft and each shaft is a hollow tubular member.

16. A racing sulky as recited in claim 12 wherein each forwardly extending shaft terminates in an extension member with said extension member bent at an angle downward with respect to a respective shaft and each shaft is a hollow tubular member.

17. A racing sulky as recited in claim 2 wherein each shaft terminates in an extension member with said extension member bent at an angle downward with respect to a respective shaft.

18. A racing sulky as recited in claim 17 wherein each forwardly extending shaft has an upward pitch.

19. A racing sulky as recited in claim 18 wherein each shaft has a concave facing downward geometry defined by a constant radius extending from near the rear end of the shaft to the extension member.

20. A racing sulky as recited in claim 7 wherein each shaft is a hollow tubular member.

21. A racing sulky as recited in claim 1 wherein each shaft has a concave facing downward geometry extending along substantially the length of the shaft.

* * * * *